(No Model.) 2 Sheets—Sheet 1.
W. NIER.
HEAD CUTTING MACHINE.
No. 525,612. Patented Sept. 4, 1894.
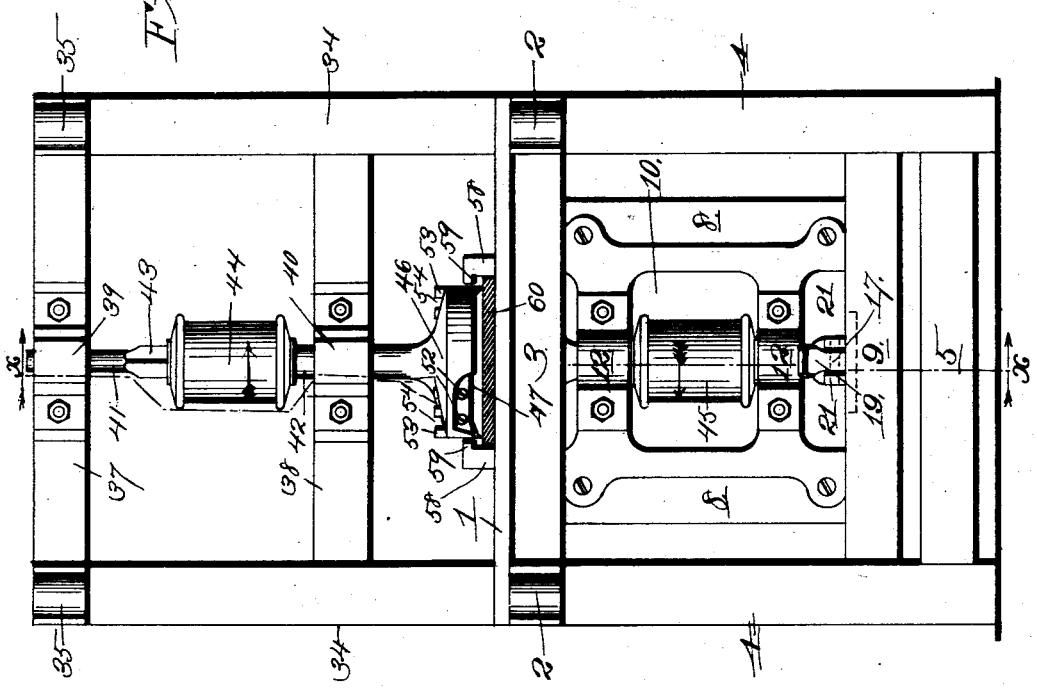
Witnesses:
F. G. Fischer
G. W. Thorpe
Inventor:
William Nier.
By Higdon & Higdon
Attys.

(No Model.) 2 Sheets—Sheet 2.
W. NIER.
HEAD CUTTING MACHINE.
No. 525,612. Patented Sept. 4, 1894.
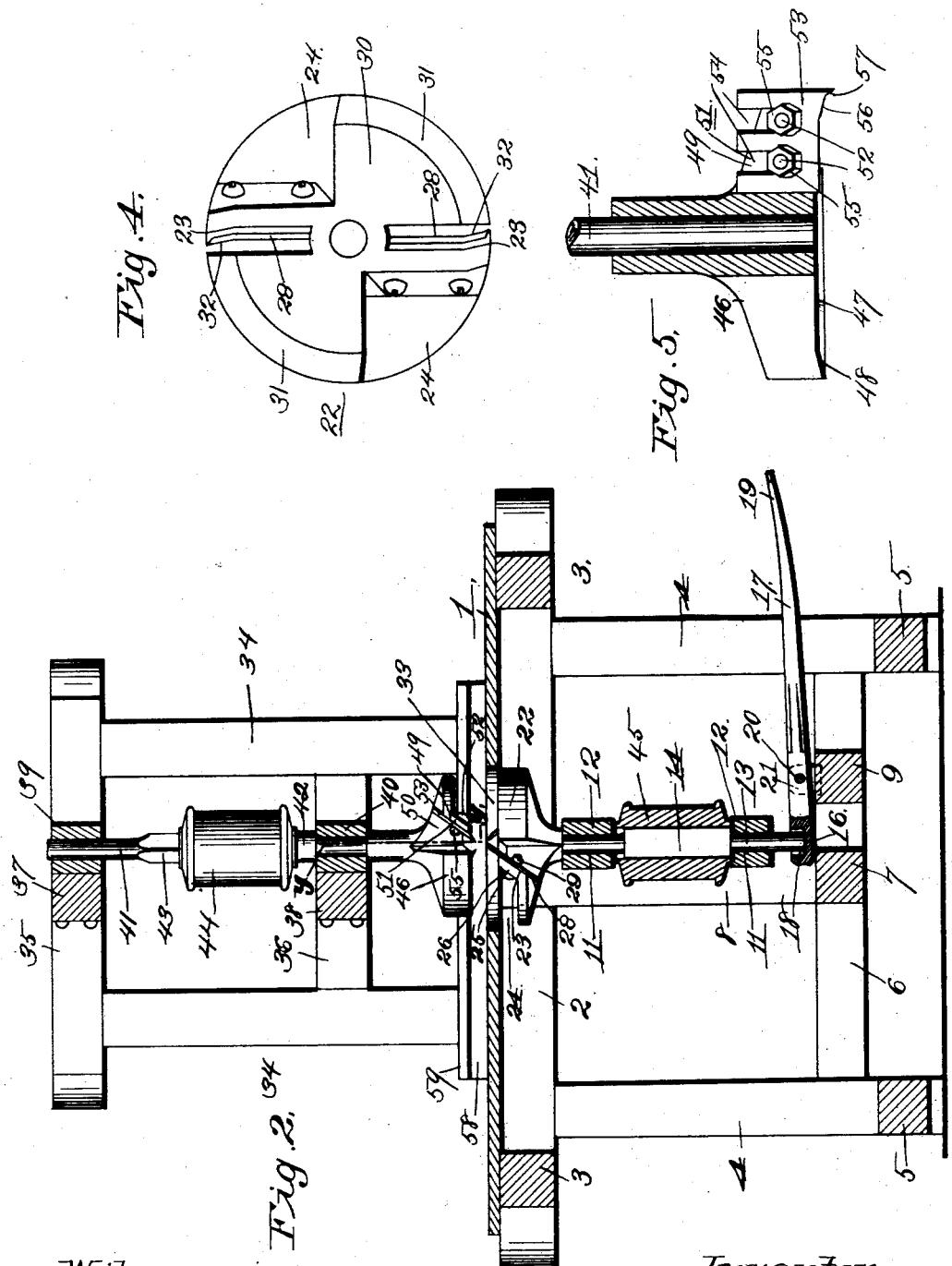
Witnesses:
F. G. Fischer
G. Y. Thorpe
Inventor
William Nier
By Higdon & Higdon
Attys.

UNITED STATES PATENT OFFICE.

WILLIAM NIER, OF KANSAS CITY, MISSOURI, ASSIGNOR OF ONE-HALF TO JAMES ARMSTRONG, J. J. ARMSTRONG, AND CHAS. M. CRAVENS, OF SAME PLACE.

HEAD-CUTTING MACHINE.

SPECIFICATION forming part of Letters Patent No. 525,612, dated September 4, 1894.

Application filed October 17, 1893. Serial No. 488,425. (No model.)

*To all whom it may concern:*

Be it known that I, WILLIAM NIER, of Kansas City, Jackson county, Missouri, have invented certain new and useful Improvements in Head-Cutting Machines, of which the following is a full, clear, and exact description, reference being had to the accompanying drawings, forming a part hereof.

My invention relates to barrel-head cutting machines, and has for its object to produce a machine of this character which is simple, durable and inexpensive of construction, positive and reliable in operation, and which is under perfect control of an operator.

With these objects in view, my invention consists in certain peculiar and novel features of construction and combinations of parts, as will be hereinafter described and claimed.

In order that my invention may be fully understood, I will proceed to describe it with reference to the accompanying drawings, in which—

Figure 1, represents a front view of the machine. Fig. 2, represents a vertical sectional view, taken on the line $x$—$x$ of Fig. 1. Fig. 3, represents a view in elevation of the upper and lower knife carrying plates or disks. Fig. 4, represents a top view of the lower knife carrying plate or disk. Fig. 5, represents a vertical sectional view of the upper knife carrying plate or disk, and taken on the line $y$—$y$ of Fig. 2.

In the said drawings, the table or workbench consists of the top 1, the side bars 2, the end bars 3, and the legs 4, upon which the side and end bars are mounted. The legs are braced near their lower ends by the bars 5 and 6, arranged parallel with the bars 3 and 2 respectively.

Arranged horizontally about midway between and parallel with the bars, is the bar 7 which is joined to the bars 6 at its opposite ends and erected vertically from the bars 7 near each end and extending upwardly to the lower side of the top of the table are the parallel bars 8. A horizontal bar 9 is arranged parallel with and a slight distance forward of the bar 7, and is also joined at its opposite ends to the bars 6; the object of this bar will be hereinafter referred to. A bracket provided with an enlarged opening 10 near its middle, and approximately rectangular in form is secured vertically to the front side of the bars 8—8, by screws as shown, or in any other suitable manner. This bracket is provided in its horizontal upper and lower portions with the vertically aligned and cylindrical bearing recesses 11 in its front face, and these upper and lower portions are adapted in conjunction with the bearing caps 12, which are bolted or otherwise secured thereto, to form a guide bearing for the vertical shaft 13 secured therein. This shaft 13 is preferably enlarged and formed square as shown at 14, and this squared portion extends when in its normal or inoperative position, from the upper side of the lower bearing to within a suitable distance of the under side of the upper bearing as shown clearly in Fig. 2, and for a purpose to be presently explained.

The end of the shaft 13 projecting below the lower bearing rests in a recess which is formed in the upper side and in the inner end of the lever 17; said recess being elongated as shown at 18 so as to allow the free operation of the devices. The outer end of this lever is preferably flattened and widened as shown at 19 so as to afford a proper hold for the foot when placed thereon to operate the lever, as hereinafter referred to, and the lever is also pivoted a suitable distance from its inner end upon the cross bolt or pin 20 which extending horizontally connects the pair of ears or projection 21 secured in the upper side of the cross bar 9.

Mounted rigidly upon the upper end of the shaft, or cast integral therewith is a disk-head or plate 22, and this disk-head or plate is provided at diametrically opposite points with the radially extending beveled or inclined faces 23; these beveled surfaces extending preferably downward and outward toward opposite sides of a central or diametrical line of the disk-head. The upper side of the disk-head is also recessed or cut away at 24 so as to provide an inclined rib or projection 25, the under side of this rib being the beveled surface 23 above referred to. These inclined ribs or projections 25 are formed to receive bolts 26 which pass therethrough and also through slots or notches 27 of the adjustable cutting knives or blades 28, which are retained firmly in position by clamping nuts 29 engaging the projecting ends of the bolts 26. The upper side of the disk head 22 is preferably concaved at 30 so as to form the upwardly and outwardly inclined shoulder or bevel 31 at its outer margin, this bevel or shoulder being annular. The upper or cutting edge of the adjustable knives or blades 28 near their outer ends are also beveled at 32 to correspond with the bevel 31 of the disk-head.

Formed through the top 1 of the table or work-bench is a circular opening or hole 33; this opening or hole being of slightly greater diameter than the disk-head described.

It will be seen from the foregoing that by depressing the outer end of the lever 17, the disk 22 provided with its outwardly projecting cutting knives or blades may be moved vertically upward through the opening 34 in the table-top until the shoulder at the upper end of the enlargement 14 of the shaft 13, comes in contact with the under side of the upper bearing therefor, and as soon as the pressure is removed from the shaft, the disk head will move downward to its original position.

Extending vertically upward from the upper side of the top of the table or work-bench, are the bars 34, a pair of these bars being arranged vertically above each side bar 2, and connected at their upper ends by bars 35, and a suitable distance from their lower ends by bars 36. Horizontal cross bars 37 and 38 connect the cross-bars 35 and 36 respectively, and approximately midway their length. Bearings 39 and 40 are secured to the front side of these cross bars 37 and 38 respectively, and are arranged above and in vertical alignment with the bearings in which the shaft 13 is journaled. A shaft 41 is journaled at its upper and lower ends in the bearings 39 and 40 respectively, and is provided with a collar or enlargement 42 which rests upon the lower bearing 40 and prevents the shaft from moving downward. The shaft 41 is also formed with a squared portion 43 which extends from the upper side of the collar or enlargement 42 to within a suitable distance of the upper bearing 39, and mounted upon the squared portion of the shaft so as to revolve with and slide upon the shaft is a belt-pulley 44, which is connected by a belt (not shown) to a counter shaft or to a motor, for the purpose. A similar pulley 45 is mounted upon the squared portion 14 of the lower shaft, and occupies snugly the space between the upper and lower bearings. This shaft is also adapted to be connected to a counter-shaft, or a motor, not shown.

Mounted upon the lower end of the shaft 41, and bearing against the under side of the bearing 40, so as to prevent any vertical movement of the shaft 41, is a disk head or circular plate 46. This disk or head 46, is recessed or concaved at its under side at 47, to form an annular and marginal shoulder or flange 48, which is beveled or inclined downwardly and outwardly or in an opposite direction to the inclined shoulder or flange 31, vertically therebeneath, of the lower disk 22. The disk-head is furthermore, cutaway so as to form at diametrically opposite points the inclined surfaces 49, corresponding but inclined in an opposite direction to the surfaces 23 of disk-head 22, and is cutaway at its upper side at 50 to form the correspondingly inclined ribs 51, through which bolts 52 are passed, and to secure the cutting knives or blades 53 in position, the said bolts pass through the notches or slots 54 in said knives or blades, and are engaged by clamping-nuts 55. By this arrangement it will be seen that the knives or blades of each disk-head, may be adjusted to make a deep or shallow-cut.

The knives or blades 53, have their cutting edge beveled or inclined downwardly and outwardly as at 56, and these beveled or inclined cutting edges 56 each terminates at its out end in a cutting edge 57, which is arranged at an angle with the cutting edge 56, and is nearly vertical. The lower end of the cutting edges 56 57, are adapted to be in the same vertical plane as and nearly in contact with the outer margin of the cutting edges 31, of the knives or blades of the under-cut disk-head, so as to insure that the "barrel-heads" shall be neatly and evenly cut at their margin or edge. The upward movement of the lower disk-head is limited, so that there will be no danger of the cutting knives or blades thereof, coming in contact with the knives or blades of the upper disk-head.

In order to provide a guide or way for the boards from which the barrel-heads are to be cut, I secure a pair of strips 58, longitudinally of the upper side of the table or work-bench, these strips being parallel and one being at each side margin of the opening 33 of the table. These strips are a distance apart corresponding to the width of the board, and are each provided near its upper margin with a longitudinal and inwardly projecting flange 59, which is adapted to overlap the adjacent edge of the board, and allow it to be raised only a limited distance, by the lower disk as will be explained in the operation of the machine, which is as follows:

The board 60 is fed from the front of the machine and longitudinally between the guide strips 58. After reaching the proper position, relative to the continuous and oppositely rotating knife or blade carrying disks 23 and 46, pressure is applied to operate the lever 17 and this operation causes the disk 22 to engage the under side of the board 60 so that it shall be engaged by the knives or blades of the oppositely rotating disk-head 46. The continuous and increasing pressure upon the lever 17 causes the board to be raised until the upper end of the squared portion of the shaft 13 comes in contact with the lower side of the upper bearing therefor, and a barrel head is severed or cut entirely from the board. By means of the beveled or inclined edges 32 and 56, the lower and upper margins of the barrel head are beveled or inclined correspondingly at 61 and 62, as shown clearly in Fig. 3, and simultaneously the approximately vertical cutting edges of the knives or blades of the upper disk-head, insure a clean and even edge cut, and also serve to cut the barrel head cleanly from the board.

Referring to Fig. 3, it will be seen that the upper and lower sides of the barrel head do not come in contact with the adjacent horizontal cutting edges of the upper and lower knives or blades of the upper and lower disk-heads, but it will be clearly understood that by employing a board of sufficient thickness, a barrel head may be produced which will fit snugly between said horizontal cutting edges of the knives or blades, and also between the beveled or inclined cutting edges of the knives. As soon as the barrel-head is cut from the board, pressure is removed from the lever 17 to allow the lower disk-head to drop down to its original position. The board is then shoved forward until a new portion is vertically beneath the upper disk-head, and the completed head forced to the rear toward the margin end of the machine at the same time.

From the above description, it will be seen that I have produced a barrel head cutting machine, which is simple, durable and comparatively inexpensive of construction, which is positive and reliable in operation, which can be adjusted to cut heads of different thickness, and which is under perfect control of an operator.

Having thus described my invention, what I claim as new, and desire to secure by Letters Patent, is—

1. A barrel head cutting machine, comprising a main frame or table, having a rotary cutter passage, an upper cutter, means comprising a vertically disposed rotary shaft held from vertical movement, having at its lower end a rotary cutter or knife carrying disk, normally held just above the passage in the table, a vertically movable shaft held under such passage, having at its upper end a rotary cutter or knife carrying disk opposing the upper cutter, said lower cutter and shaft normally held at the lowermost position a foot lever mechanism for raising such shaft and cutter against the board to force it against the upper cutter, and means for rotating such cutter disks in reverse directions all substantially as shown and described.

2. As an improvement in barrel head cutting machines, the combination with a table having an opening, a rotary cutter disk held normally above such opening and from vertical movement whereby a board passage between such cutter and the table is provided, guideways at the sides of such passage, a vertically movable cutter carrier, held under the said table opening provided with a horizontal rotary cutter disk at its upper end normally held under the board passage and means for elevating the said carrier substantially as shown, whereby it is moved in contact with the under face of the board to trim it and at the same time force such board against the upper cutter as and for the purposes specified.

3. A barrel head cutting machine, comprising a supporting frame having a table with an opening therein, and having side guides to form a board passage, a revolving shaft held vertically over the opening and having a cutter carrying disk at its lower end projected between the said board guides, a carrier held for vertical movement, having a cutter carrying disk at its upper end, normally held below the opening in the table, and having a stop member whereby to limit its upward movement, and means for moving such carrier vertically all substantially as shown and described.

4. As an improvement in barrel head cutting machines, the combination with a frame having a table portion provided with a cutter passage and guideways having stop flanges to limit the upper pressure on the board, an upper rotary cutter disposed horizontally over such passage and having cutters projected between the guides and with their cutting edges below the stop flanges, a lower rotary cutter disposed horizontally under the passage, and vertically movable through such passage against the board, lever devices for elevating the said lower cutter and means for rotating such cutters substantially as shown and described.

5. In a barrel head cutting machine, the combination with an upper rotary cutter disk held from vertical movement said disk having cutters formed with approximately vertical marginal portions projected beyond the rim face of the disk, a lower rotary cutter disk and disk carrying shaft held for vertical reciprocation, said disk having marginal portions projected beyond the rim face of the disk, said shaft having a stop portion adapted to engage the frame of the machine, and arranged to stop the vertical movement of the lower cutter as the cutters sever the board, and means for elevating the said lower shaft and cutter all arranged substantially as shown and described.

In testimony whereof I affix my signature in the presence of two witnesses.

WILLIAM NIER.

Witnesses:
MAUD FITZPATRICK,
JOHN T. SULLIVAN.